United States Patent [19]
Picquendar

[11] 4,125,747
[45] Nov. 14, 1978

[54] TELEPHONE SWITCHING CIRCUIT

[75] Inventor: Jean-Edgar Picquendar, Paris, France

[73] Assignee: Thomson-CSF, Paris, France

[21] Appl. No.: 736,203

[22] Filed: Oct. 27, 1976

[30] Foreign Application Priority Data

Oct. 28, 1975 [FR] France ............... 75 32929

[51] Int. Cl.² ........................... H04Q 11/04
[52] U.S. Cl. .................. 179/15 AT; 179/15 AQ
[58] Field of Search ........ 179/15 AT, 15 AQ, 15 BA, 179/15 A, 18 J

[56] References Cited
U.S. PATENT DOCUMENTS

| | | | |
|---|---|---|---|
| 3,458,659 | 7/1969 | Sternung | 179/15 AQ |
| 3,761,894 | 9/1973 | Pilc | 179/15 AQ |
| 3,790,715 | 2/1974 | Inose | 179/15 BA |
| 3,924,079 | 12/1975 | Garrett | 179/15 A |
| 3,959,594 | 5/1976 | Srivastava | 179/15 BA |

Primary Examiner—David L. Stewart
Attorney, Agent, or Firm—Cushman, Darby & Cushman

[57] ABSTRACT

The present invention relates to telephony switching circuits which are used in electronic automatic exchanges operating on the time-division multiplex system known as PCM. According to the invention, a spatial and time switching circuit comprises a plurality of registers for memorizing the binary words of an input PCM frame, a plurality of time-slot registers for memorizing the output time-slots of the binary words, means for reading out the binary words registers when the time-slots defined by the time-slot registers occur, means for spatially switching the binary words thus read out onto a plurality of output PCM links, and means for filling the output time-slots into the time-slot registers and selecting the output PCM links.

1 Claim, 1 Drawing Figure

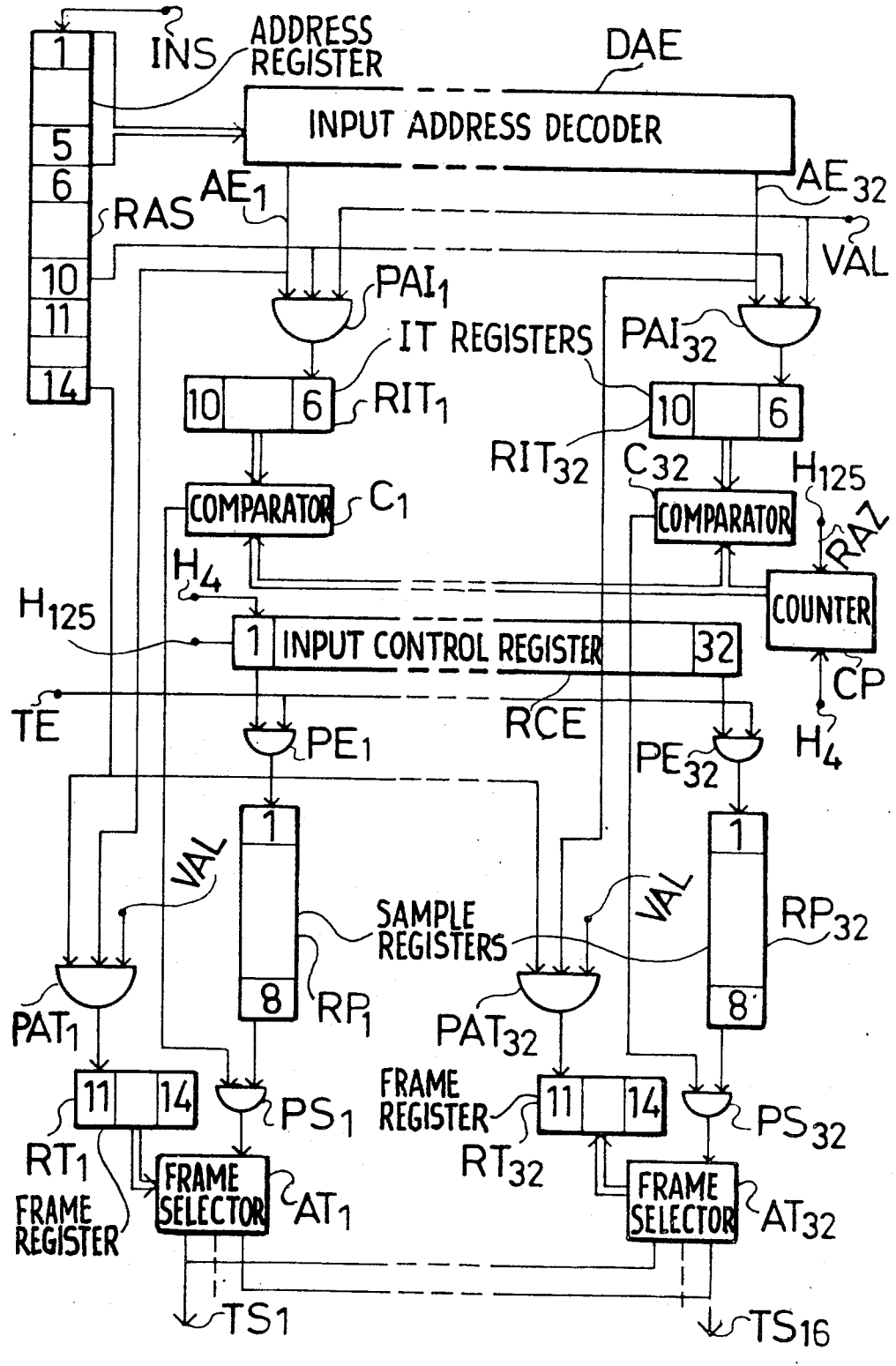

TELEPHONE SWITCHING CIRCUIT

The present invention relates to telephony switching circuits which make it possible to establish communications between two telephony channels connected to one and the same automatic exchange. It relates more particularly to circuits which, in order to establish this communication, utilise time division multiplexing of the PCM (Pulse code modulation) kind.

In order to ensure compatibility between the various telephony transmission systems, both at the national and the international level, very strict standards have been established which are scrupulously adhered to. The figures used in the ensuing part of this text are employed in relation to these standards and more particularly to the European version thereof, but do not in any way detract from the general nature of the invention.

In order to perform this kind of multiplexing, first of all the telephony signals in each channel are sampled at the frequency of 8 kHz. The samples thus obtained are then converted to an 8 bit digital form and subsequently time-division multiplexed in order to form a 32 channel frame. In fact, in the frame, only 30 channels are effectively assigned to telephonic communications, the two remaining ones being used for synchronisation and signalling. However, it is entirely possible not to singularise these in the switching network, and this very much simplifies matters in particular as far as the time scale is concerned.

Thus, each PCM frame lasts $125\mu$ and comprises 32 time intervals referred to as time slots and each lasting $3.90625\mu$. Generally, the convention is to use an approximate value of $4\mu$ to define the time of the time slots and it is also a frequent habit to confuse time slot and sample when speaking of these systems.

In order, within an automatic exchange, to connect one channel with another, it is necessary to displace the samples representing this channel from a given time slot in one frame to another given time slot in another frame (possibly the same one). This can be done using circuits which, depending their mode of operation, are referred to as time switches or spatial switches. These switches are controlled by a central unit which supplies control signals making it possible to store there the desired spatial/time routings. The description of circuits of this kind and their assembly within an automatic switching system, is to be found in the article entitled "High-capacity time switching networks" published by P. Voyer et al. in the magazine "Commutation et Electronique" No. 43 October 1973 pages 52 to 70.

In accordance with the present invention it is provided a telephone circuit for switching $n$ samples distributed according to a first natural sequence in an incoming PCM frame into $n$ time intervals distributed amongst $m$ output PCM frames, said circuit comprising:

first memory means for storing said samples into $n$ storage positions in an order determined by said first natural sequence;

second memory means for storing $n$ time addresses determining a second natural sequence and $n$ frame addresses, each of said time addresses and each of said frame addresses being related to one of said storage positions;

reading means for reading said first memory means under the control of said second memory means in an order determined by said second natural sequence, delivering time switched samples; and switching means for spatially switching said time switched samples into $m$ first output connections under the control of said second memory means, said first output connections being selected in accordance with said frame addresses.

For a better understanding of the invention, and to show how the same may be carried into effect, reference will be made to the ensuing description and to the attached FIGURE which illustrates the block diagram of a circuit according to the invention.

The FIGURE therefore illustrates a circuit in accordance with the invention, which is capable of distributing the 32 samples of an input frame TE amongst the 512 time slots of 16 output frames $TS_1$ to $TS_{16}$. The drawing is limited in the case of the elements which occur repeatedly, to those assigned to the 1st and 32nd samples of the input frame. On the single connections, the bits circulate in series, whilst on the thick connections the bits circulate in parallel. Only the connections supplying the clock signals at the field frequency (H 125) and the time slot frequency (H 4) have been shown, and the connections supplying the clock signal at the bit frequency, this making it possible in particular to feed the bits through the registers, have been omitted. These registers have been shown in the form of rectangles containing boxes representing stages of these registers; in the boxes there are indicated the numbers of the stages and therefore the bits introduced into the registers in series.

The circuit comprises an address register RAS, and input address decoder DAE, 32 time slot address gates, $PAI_1$ to $PAI_{32}$, 32 time slot registers $RIT_1$ to $RIT_{32}$, 32 comparators $C_1$ to $C_{32}$, a counter CP, an input control register RCE, 32 input gates $PE_1$ to $PE_{32}$, 32 sample registers $RP_1$ to $RP_{32}$, 32 output gates $PS_1$ to $PS_{32}$, 32 frame address gates $PAT_1$ to $PAT_{32}$, 32 frames registers $RT_1$ to $RT_{32}$, and 32 frame selectors $AT_1$ to $AT_{32}$. Elements carrying the same index form a functional assembly marked by reference to an time slot number of the input frame, and these will be qualified in the ensuing part of this text of homologous elements.

The 32 samples of an input frame applied to the connection TE are stored, in an order given by their natural sequence in this input field, in the 32 storage positions represented by the registers $RP_1$ to $RP_{32}$.

For this purpose, the leading edge of the clock signal $H_{125}$ applied to the stage 1 of the register RCE makes it possible to introduce a bit one into this stage at the commencement of each input frame. This bit is displaced from stage to stage through the register RCE under the control of the clock signal $H_4$, during the time of a frame. Each stage is connected to that of the gates $PE_1$ to $PE_{32}$ whose index is the same as the number of the stage. Thus, the gates are opened one after the other during the time of the time slot whose number corresponds to their index. They therefore in turn allow the 8 bits representing the sample applied at that instant to the connection TE, the latter being connected to all the gates PE, to pass.

The samples stored in the registers $RP_1$ to $RP_{32}$ are distributed to the 16 output frames serviced by the 16 connections $TS_1$ to $TS_{16}$, as a function of instructions furnished to the switching circuit by the central unit of the automatic exchange. These instructions arrive on the connection INS in the form of 14-bit words. These words do not directly control the selecting of the samples but are stored in the form of time addresses and spatial addresses which modify the state of the means used to read out the registers RP and of the selecting means AT.

Each instruction word is first of all introduced from the connection INS into the address register RAS where it is stored temporarily. The bits 1 to 5 of this word are read out in parallel by the input address decoder DAE, which, on one of its 32 outputs $AE_1$ to $AE_{32}$ furnishes a bit indicating that sample in the input field to which the instruction present in the RAS applied. This decoder is a conventional element which combines the five input bits for example using AND-gates, in order to obtain one of the 32 output signals; in other words, 5 bits are sufficient to define 32 states.

The 32 outputs AE of DAE are connected to the homologous gates DAE which simultaneously receive a validation signal furnished by the central unit of the computer on the connection VAL, and the bits 6 to 10 of the instruction word, which are read out in series from the register RAS.

The gates PAI being 3-input AND-gates, only that which receives a bit 1 from DAE will allow the bits 6 to 10 to pass when the validation signal permits. This validation signal is provided so that the said bits are only passed when in fact there is a new instruction in RAS.

The outputs of the gates PAI are connected to the inputs of the homologous registers RIT so that the bits 6 to 10 of the instruction word, constituting the time address, are recorded in the register RIT whose number is given by the bits 1 to 5 of this word, these bits 1 to 5 constituting an input address.

In the same way, the bits 11 to 14 of the instruction word are read out in series and applied to the gates PAT which also receive the validation signal through the connection VAL and are also connected to the homologous outputs AE. The outputs of these gates are connected to the inputs of the homologous registers RT and therefore the bits 11 to 14 of the instruction word, constituting the spatial address, are recorded in the register RT whose number is given by the bits 1 to 5 of this word.

The counter CP is a 32-state counter and cycles in the rhythm of the clock signals $H_4$. It is also supplied with the clock signal $H_{125}$ at its reset input RAZ, this making it possible to maintain its phase in order that its zero state coincides with the first word of each input field.

The states of this counter are coded in the form of 5 bits using the same code as the time addresses. These 5 bits are applied in parallel to the 32 comparators $C_1$ to $C_{32}$. These comparators are also supplied in parallel with the 5 bits contained in the homologous registers RIT. Comparators of this kind are known elements which make it possible, through the agency of a combination of AND-gates for example, to detect the identity of two words presented at their inputs.

When one of the comparators detects an identity in this way, it supplies a bit at its output. This output is connected to the homologous gate PS and the latter is therefore opened by the arrival of this bit, enabling the 8 bits contained in the homologous register RP to be applied in series to an homologous selector AT.

Thus, as the states of the counter C develop, the storage positions represented by the registers C are read out in the order determined by the natural succession of the time addresses, contained in the registers RIT.

It should be pointed out that 16 of these addresses may be identical since the 16 samples thus read out simultaneously can be directed to the time slots of the same order, in 16 different output frame.

Thus, a sample fed into number $i$ time slot of the input frame is stored in the register $RP_i$ and leaves the register during the number $j$ time slot of an output frame, $i$ being furnished by the bits 1 to 5 and $j$ by the bits 6 to 10, of the instruction word. The output frames and input frames being isochronous, if $j$ is less than $i$ the sample then leaves during the next frame, although this is of no importance.

Thus, time switching has been effected.

The 4 bits contained in the register $RT_1$ to $RT_{32}$ are read out in parallel and applied to the homologous frame selectors $AT_1$ to $AT_{32}$.

These selectors receive from the homologous gates PS the samples previously fed out under the control of the homologous comparators C, and direct these samples to one of their 16 output connections each of which services an output frame. This selecting operation and therefore the designation of the output frame, is performed under the control of the 4 bits received from the register RT, these 4 bits constituting the frame address. These selectors are known elements comprising for example AND-gates which are opened by a decoder analysing the states presented by the 4 address bits. Each output connection of a selector is connected to the 15 connections of the same order in the 15 other selectors.

Thus, a spatial switching operation superimposed upon the aforedescribed time switching operation, has been effected.

In order to illustrate in a more synthetic manner, the way in which this switching circuit operates, let us follow the path of a given sample entering at the time slot 13 in the input frame and leaving at the time slot 25 in the 12th output frame.

The circuit will initially have received an instruction signal whose bits 1 to 5 designate the time slot 13, the bits 6 to 10 the time slot 25 and the bits 11 to 14 the 12th output frame. Under the control of the bits 1 to 5, the number 25 has therefore been stored in the register $RIT_{13}$ and the number 12 in the register $RT_{13}$. This state of the registers $RIT_{13}$ and $RT_{13}$ will remain fixed for as long as the communication thus established lasts. Thus 31 other states can be stored by addressing 31 other instructions to the circuit.

The sample 13 of the input frame is first of all stored in the register $RP_{13}$ when the bit 1 arriving in storage position 13 of the register RCE opens the gate $PE_{13}$.

At time slot 25, the decoder $C_{13}$ notes identity between the bits furnished by the counter C and those contained in the register $RIT_{13}$. It then opens the gate $PS_{13}$ enabling the given sample to leave the register $RP_{13}$ during said same time slot 25, so that time switching has been effected.

This sample is directed towards the connection $TS_{12}$ servicing the output frame 12, by the selector $AT_{13}$ which is under control of the register $RT_{13}$ thus effecting spatial switching.

The switching circuit thus created unites an assembly of functions which are specially matched to one another and form a remarkably uniform whole, this making it possible to gather the assembly into a single integrated circuit which can be used in a highly repetitive manner in an automatic exchange.

The following document has been quoted during the French prosecution:

French patent FR No. 2 165 659 (Ericsson).

What I claim is:

1. A telephone circuit for switching $n$ samples distributed according to a first natural sequence in an incoming PCM frame into $n$ time intervals distributed amongst $m$ output PCM frames, said circuit comprising:

first memory means for storing said samples into $n$ storage positions in an order determined by said first natural sequence including an input control register with $n$ states, the first one of said stages having a first clock input connection for receiving a binary digit, said states having a common second clock input connection for receiving a displacement clock signal, a first set of $n$ first gates, said first gates being connected to a second input connection for receiving said samples and respectively to said states, and a set of $n$ sample registers connected to said first $n$ gates.

a second memory means for storing $n$ time addresses determining a second natural sequence and $n$ frame addresses, each of said time addresses and each of said frame addresses being related to one of said storage positions;

third memory means for temporarily storing an instruction word comprising an input address, one of said time addresses, and one of said frame addresses;

control means for controlling the storing of said one of the time addresses and of said one of the frame addresses into said second memory means, in accordance with said input address including a decoder with a first input connection for receiving said input address, and $n$ second output connections, a second set of $n$ second gates, said second gates being connected to respectively said second output connections, to said third memory means for receiving said time address, to an external connection for receiving a validation signal, and to said second memory means, a third set of $n$ third gates, said third gates being connected to respectively said second output connections, to said third memory means for receiving said frame address, to said external connection, and to said second memory means;

reading means for reading said first memory means under the control of said second memory means in an order determined by said second natural sequence, delivering time switched samples including a counter connected to said second clock input connection for counting said displacement clock signal and to said first clock input for being reset by said binary digit, said counter marking a succession of $n$ states; a set of $n$ comparators connected to said counter and to said second memory means to comparing said states with said time addresses; and a fourth set of $n$ fourth gates, said fourth gates being connected to respectively said comparators and to respectively said sample registers.

switching means for spatially switching said time switched samples into $m$ first output connections under the control of said memory means, said first output connections being selected in accordance with said frame addresses including a set of $n$ selectors connected to respectively said fourth gates and to said second memory means, and each of said selectors being connected to each of said first output connections.

* * * * *